W. N. MARTIN.
Bridle-Bits.

No. 149,497. Patented April 7, 1874.

Witnesses:
Revel. D. Darling,
Horace Wickham Jr.

Inventor:
Wm. N. Martin.

UNITED STATES PATENT OFFICE.

WILLIAM N. MARTIN, OF NEW YORK, N. Y., ASSIGNOR, BY MESNE ASSIGNMENTS, OF PART OF HIS RIGHT TO MORGAN R. BELLINGER, OF SAME PLACE.

IMPROVEMENT IN BRIDLE-BITS.

Specification forming part of Letters Patent No. 149,497, dated April 7, 1874; application filed November 21, 1873.

*To all whom it may concern:*

Be it known that I, WILLIAM N. MARTIN, of the city, county, and State of New York, have made certain Improvements in Bridle-Bits, of which the following is a specification:

The object of my improvements is to prevent a horse from, and break him of the habits of, pulling on one or both reins, catching and keeping the bit between the teeth, and to give the driver great power and control over a horse at all times, especially in case of a run-away, &c.; and consists in a curved arm or lever attached to, or forming a part of, a bit; and also consists in an elastic band, both of which will be hereinafter more fully described.

Figure 1:
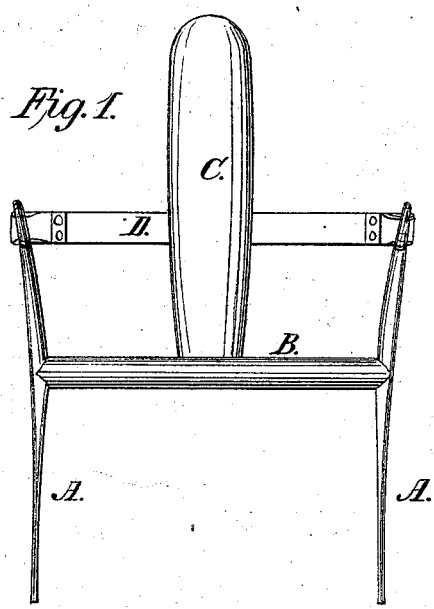
Figure 2:
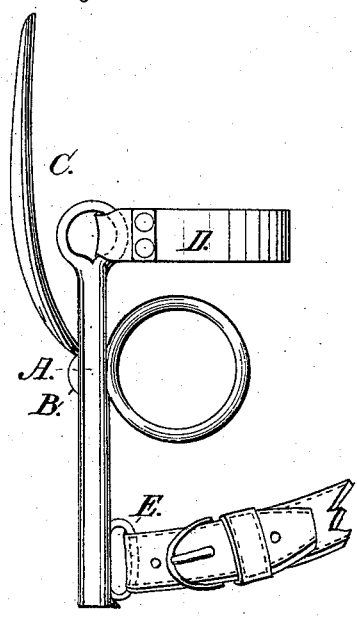

Figure 1 is a front view of an ordinary curb-bit with my improvements attached; Fig. 2, a side view of an ordinary curb-bit with my improvements attached.

A A are the cheek-pieces of an ordinary curb-bit; B, the mouth-piece, connecting the two cheek-pieces; C, a curved arm or lever, the arm or lever C to be curved length and crosswise, so as to conform to the roof of a horse's mouth; for if it be made flat instead of curved it will not strike against the roof of the mouth, but will leave a space between the arm or lever and the roof of the mouth. My improved arm or lever does not pry open the mouth, but strikes against a tender part of the roof of the mouth whenever the horse or driver pulls on one or both reins, the reins being connected to the bit at the rings E E, and when pulled upon by the horse or driver the lower part of the cheek-pieces A A are moved back and the curved arm or lever C is pressed against the roof of the mouth; but as soon as the horse or driver stops pulling on the reins the curved arm or lever C, and the other parts of the bit, will be brought back to their original positions by means of the elastic band D, (which is connected to the cheek-pieces A A and under the jaw of the horse,) which stretches and contracts whenever the reins are pulled or eased upon, and by so doing removes the pressure of the curved arm or lever C from the roof of the horse's mouth, the arm or lever C pressing against the roof of the mouth only when the reins are pulled upon; therefore it does not stop the circulation of the blood, or in any wise hurt the roof of the mouth, for whenever it does press against the roof of the mouth, it, being curved, simply conforms itself to the roof of the mouth, there being no sharp edges.

The elastic band D can be dispensed with, if so desired, as the bit and its connections will regain their original positions by their own gravity.

I claim—

1. In combination with a bridle-bit, a curved arm or lever, for the purposes hereinbefore set forth.

2. The combination of a curved arm or lever, an elastic band, and a bridle-bit, substantially as and for the purposes hereinbefore set forth.

WM. N. MARTIN.

Witnesses:
REUEL D. DARLING,
HORACE WICKHAM, Jr.